M. COHEN.
AUTOMATIC JACKING DEVICE FOR SELF PROPELLED VEHICLES.
APPLICATION FILED APR. 19, 1916.

1,266,409.

Patented May 14, 1918.
4 SHEETS—SHEET 1.

INVENTOR,
Myer Cohen
BY David Lichtenstein
ATT'Y.

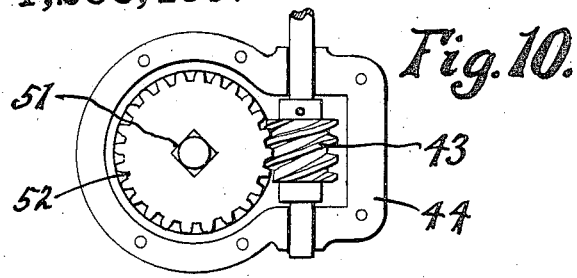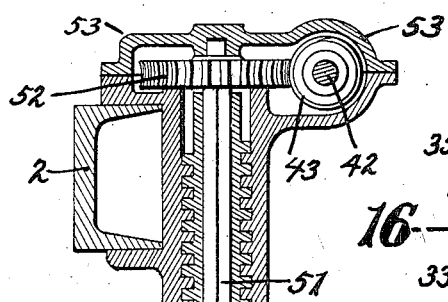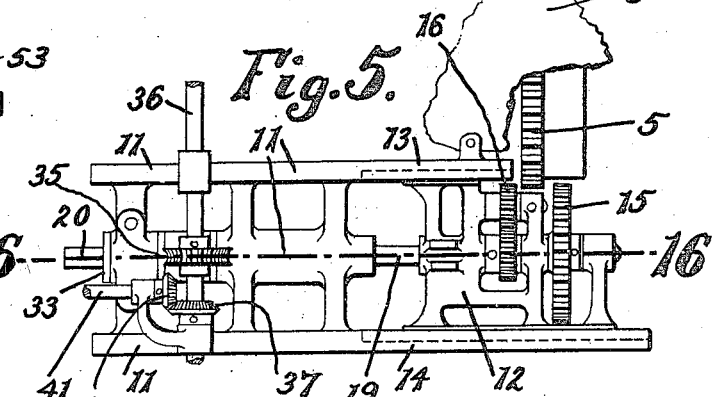

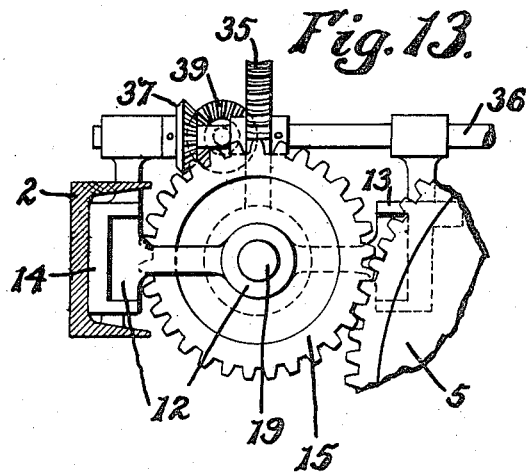
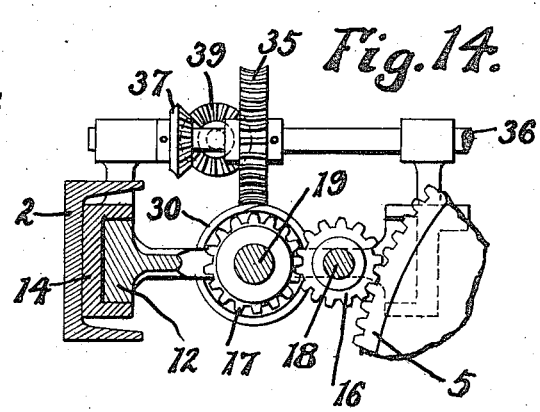
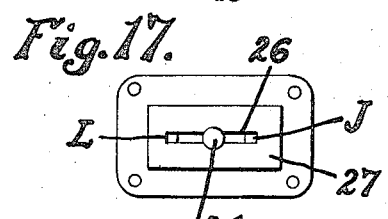
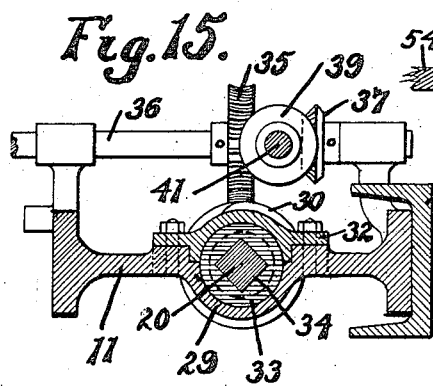
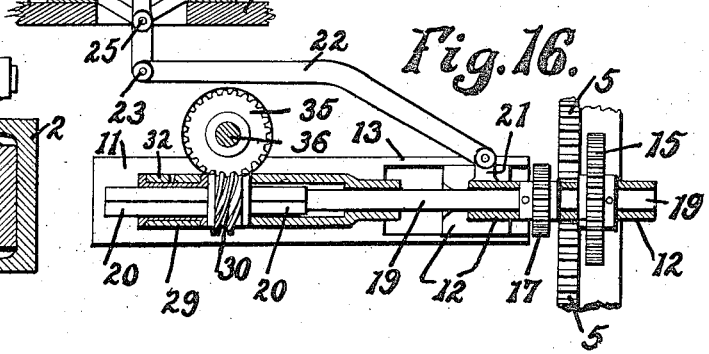
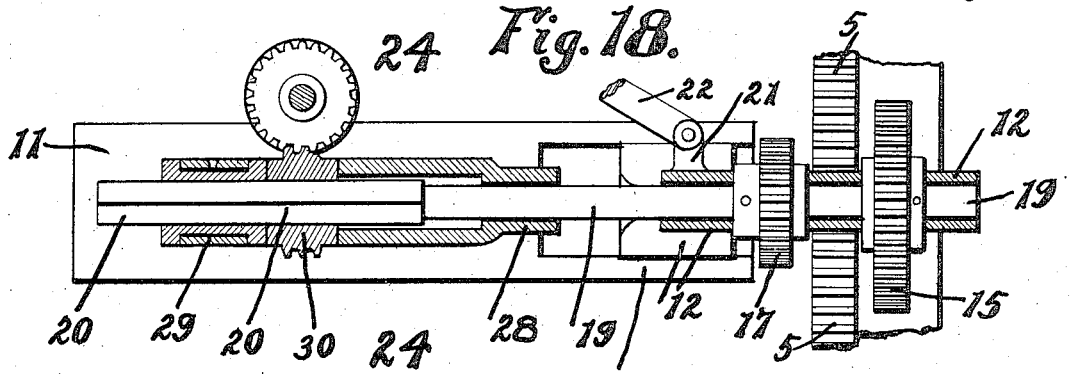
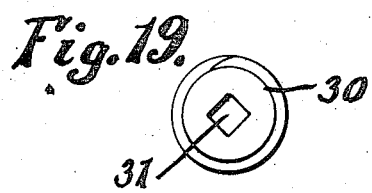

M. COHEN.
AUTOMATIC JACKING DEVICE FOR SELF PROPELLED VEHICLES.
APPLICATION FILED APR. 19, 1916.
1,266,409.
Patented May 14, 1918.
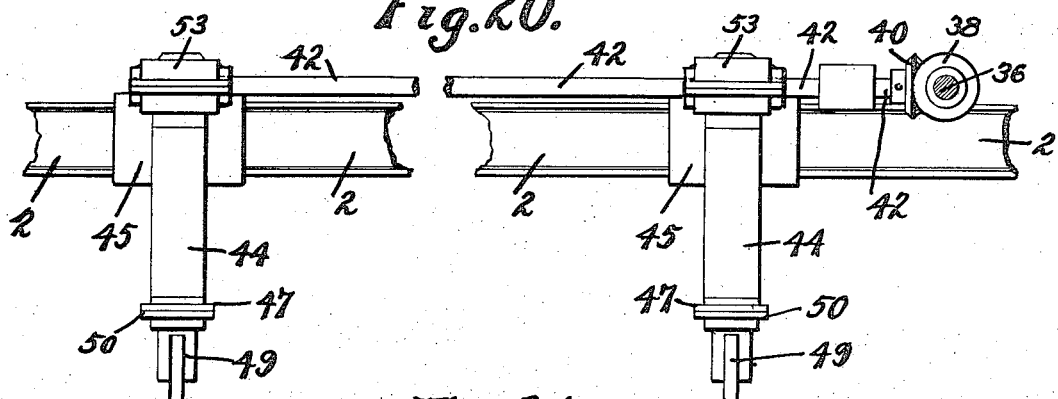
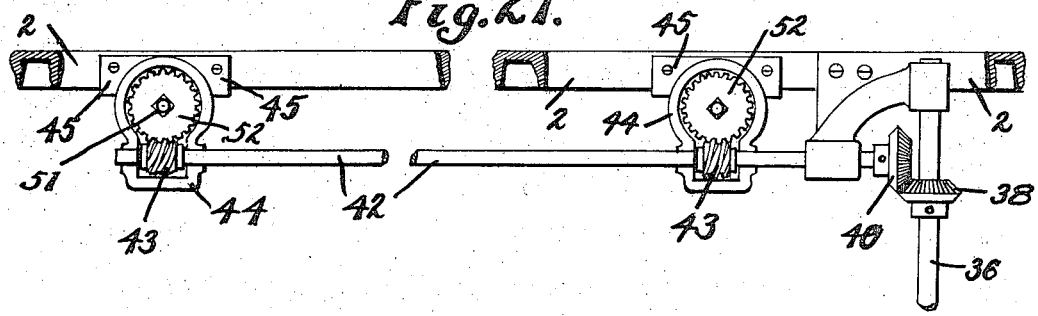
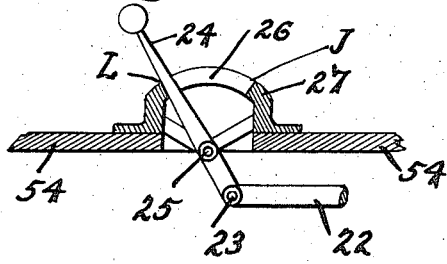
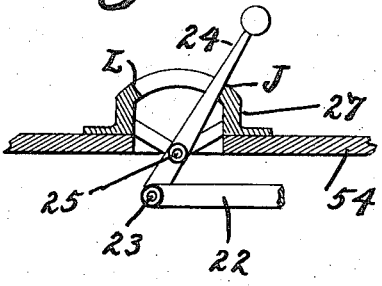
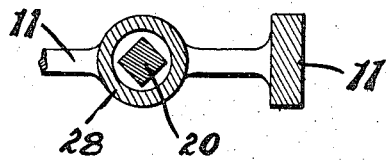
INVENTOR,
Myer Cohen
BY
David Lichtenstein
ATT'Y.

UNITED STATES PATENT OFFICE.

MYER COHEN, OF REVERE, MASSACHUSETTS.

AUTOMATIC JACKING DEVICE FOR SELF-PROPELLED VEHICLES.

1,266,409.  Specification of Letters Patent.  Patented May 14, 1918.

Application filed April 19, 1916. Serial No. 92,293.

*To all whom it may concern:*

Be it known that I, MYER COHEN, a citizen of the United States, residing at Revere, in the county of Suffolk and State of Massachusetts, have invented a new and useful Automatic Jacking Device for Self-Propelled Vehicles, of which the following is a specification.

The object of my invention is to provide a power operated jacking or elevating device for self-propelled vehicles, especially automobiles and the like, which is adapted to be directly coupled with and operated by the motive power of the vehicle, or parts operated thereby, and is capable of automatically jacking the vehicle upwardly so that the wheels of the same are lifted from off the ground with the vehicle supported in the raised position,—the device being especially intended for self-propelled vehicles using pneumatic tires, affording the vehicle a means for supporting the same in the raised position, whereby the tires may be readily relieved from the load of the vehicle when the same is not in use, i. e. when the vehicle is put up in the garage for the night, or stored for the season; as well as affording the vehicle a ready and powerful jacking means for use in emergency cases, as when a blow-out or puncture occurs *en route* and it becomes necessary to jack the vehicle for permitting the replacing of new tires, et cetera.

To these as well as other ends, my invention consists in the novel features of construction, combination and arrangement of parts described in the following specification and especially pointed out in the subjoined claims.

Referring to the accompanying four sheets of drawings—

Fig. 5 represents an enlarged plan view of the operating and driving mechanism of my device, showing the same set in the neutral position with the power-transmitting wheel of the propelling mechanism of the vehicle.

Fig. 6 represents the same view as Fig. 5 but shows the jacking gear engaging with the fly-wheel.

Fig. 7 represents the same view as Fig. 5 but shows the lowering gears engaging with the fly-wheel.

Fig. 8 represents a transverse sectional view taken on lines 8—8 in Fig. 2 through the jacking member of the device, showing the same in the non-operating position.

Fig. 9 represents the same view as Fig. 8 but shows the jacking member in the extreme operating position.

Fig. 10 represents a plan view of the jack operating mechanism shown in Figs. 8 and 9, with the top-cover-plate removed therefrom.

Fig. 11 represents a sectional view taken on line 11—11 in Fig. 9.

Fig. 12 represents a sectional view taken on line 12—12 in Fig. 9.

Fig. 13 represents an end view taken on line 13—13 in Fig. 6, looking in the direction of the arrows, showing the jacking-gear engaging with the fly-wheel of the engine.

Fig. 14 represents a sectional view taken on line 14—14 in Fig. 7 looking in the direction of the arrows, showing the lowering gears of the device engaging with the fly-wheel of the engine.

Fig. 15 represents a sectional view taken on line 15—15 in Fig. 7 looking in the direction of the arrows.

Fig. 16 represents a longitudinal sectional view taken on line 16—16 in Fig. 5, showing the sliding and operating member of the device engaging with the operating lever thereof.

Fig. 17 represents a plan view of the operating lever shown in Fig. 16.

Fig. 18 represents an enlarged view of part of Fig. 16, showing the operating mechanism of the jacking device set in neutral position.

Fig. 19 represents an end view of the driving-worm-gear shown in Figs. 16 and 17.

Fig. 20 represents a view taken on line 20—20 in Fig. 3, showing the jacks with the operating mechanism thereof supported on, and secured to the chassis of the car.

Fig. 21 represents a plan view of Fig. 20, but shows the top plates of the jacking members removed therefrom.

Fig. 22 represents a view showing the operating lever of my device shifted to the lowering position, corresponding to Fig. 7.

Fig. 23 represents a view showing the operating lever of my device shifted to the jacking position, corresponding to Fig. 6.

Fig. 24 represents a sectional view taken on line 24—24 in Figs. 6 and 18.

Like numerals refer to like parts throughout the several views of the drawings.

Figure 3:
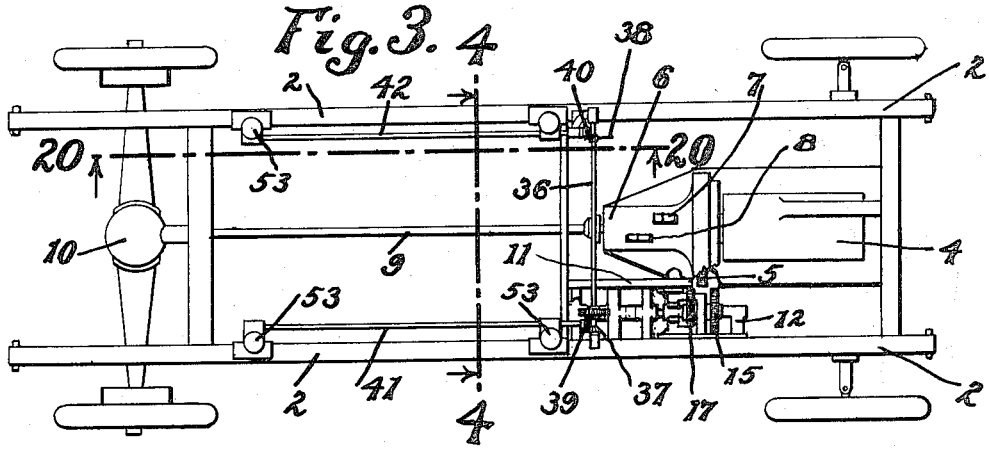
Fig. 3 represents a plan view of Fig. 2, showing my device set in its relative position with the power plant of the vehicle.

The numeral 1 in its entirety represents a self-propelled vehicle, or automobile, having the conventional type of chassis 2 equipped with the power plant 3 consisting preferably of the common type of internal combustion engine 4, having the toothed fly-wheel 5 which is ordinarily used in connection with common types of self-starting devices. The numeral 6 represents the conventional form of housing used to house the fly-wheel, the reversing mechanism, the speed-changing mechanism, and the clutch mechanism of the vehicle,—the numeral 7 in Fig. 3 representing the ordinary operating lever used for operating the reversing and speed-changing mechanism, while 8 represents the operating lever of the clutching mechanism. The numeral 9 represents the conventional type of transmission-shaft used for operating the differentials housed in the rear axle 10 of the vehicle for driving the same. The numeral 11 represents the frame member of the operating mechanism of the jacking device which is secured preferably to the chassis, as shown in Figs. 3, 13, 14 and 15, and with the housing 6 of the power plant of the vehicle, so that the sliding and shifting member 12, which is slidably set in the arms 13 and 14 of the frame member 10 and carries the jacking-gear 15 and the lowering gears 16 and 17, may be brought into working engagement with the fly-wheel 5 of the engine 4 in the manner hereinbefore described. The gear 16 is supported on the sliding member 12 and is free to turn as an idler on the stud 18 which is secured to the sliding member 12, and the gears 15 and 17 are each pinned, or otherwise suitably secured, to the sliding shaft 19 which is preferably provided with the square portion 20. The sliding member 12 is provided with the lugs 21, to which is secured the connecting link 22 which has the end 23 pivotally secured to the operating lever 24, said operating lever being fulcrumed at 25 and operates within the slot 26 of the lever arc 27. The frame member 11 is preferably provided with the bearings 28 and 29 between which is rotatably secured the driving-worm-gear 30 which is preferably provided with the square hole 31 to accommodate the square shaft 20 to permit the same to slide within said worm-gear along with the sliding member 12. The end-bearing 29 is preferably provided with the bearing-cap 32, which rotatably secures the bearing-sleeve 33 in the frame member 11, which sleeve is also provided with the square hole 34 for slidably fitting the square section 20 of the sliding shaft 19.

The worm-gear 30 drives the worm-wheel 35 which is secured to the transverse-shaft 36, which shaft is provided preferably with the bevel-gears 37 and 38 which are rigidly secured thereto and adapted to turn therewith for driving the bevel-gears 39 and 40, secured to the horizontal shafts 41 and 42, respectively, and adapted to turn the same therewith. The shafts 41 and 42 are each provided with worm-gears 43 which are rigidly secured thereto to rotate therewith and which are housed within the jack-housings 44, which housings are preferably provided with flanges 45, by means of which the same may be rigidly coupled with the chassis 2 of the vehicle. The jack-housings 44 are bored and tapped preferably with the square threads 46 for accommodating the threaded jacking members 47 which operate within said housing 44 and are provided with the square holes 48 and the swivel-roller members 49 which are associated therewith and held in operating position by means of the flanges 50. The housing members 44 are provided with the jack-operating key-shafts 51 which are preferably made in square section to accommodate the square-shaped holes 48 of the jacking members 47, as shown in Figs. 8 and 9, and are rigidly secured to operate with the worm-wheels 52 which engage with the driving-worm-gears 43. The housing members 44 are provided also with the cap members 53 which inclose said gears 43 and 52.

The numeral 54 represents the floor of the vehicle to which is secured the operating lever arc 27.

Figure 2:
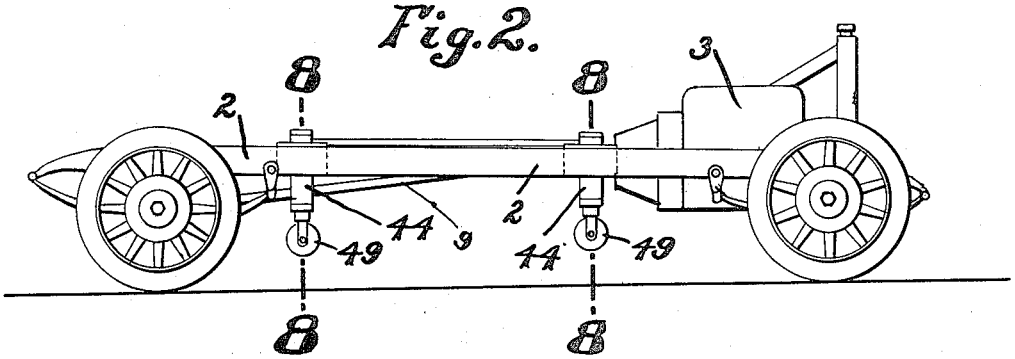
Fig. 2 represents a view of a chassis of an automobile supplied with my device, showing the same set in the non-operating position.

It will be here noted that when the device is in the normal position, shown indicated by the raised position of the jacking members in Fig. 2, that the projection of the lowest part of the same should not (if possible) project below the axle or other projecting members of the vehicle, for permitting the same to clear and pass over ordinary road obstacles without interference when the vehicle is *en route*.

It will also be noted that the neutral position of the operating lever of my device is the mid position of the arc, as indicated by the position shown in Fig. 16. The lever may be preferably supplied with some suitable locking means for holding the same against working away from said neutral position, for negativing the possibility of the sliding member 12 (with which the same is connected by means of the connecting-link 22) against working out from the neutral position in one direction or the other; thus eliminating the possibility of either one or the other of the gears 15 and 16 to engage with the gear 5 of the fly-wheel when the operating lever is set in the neutral position.

Having thus described my invention in detail, the manner in which the same may be operated is as follows:—

Figure 1:
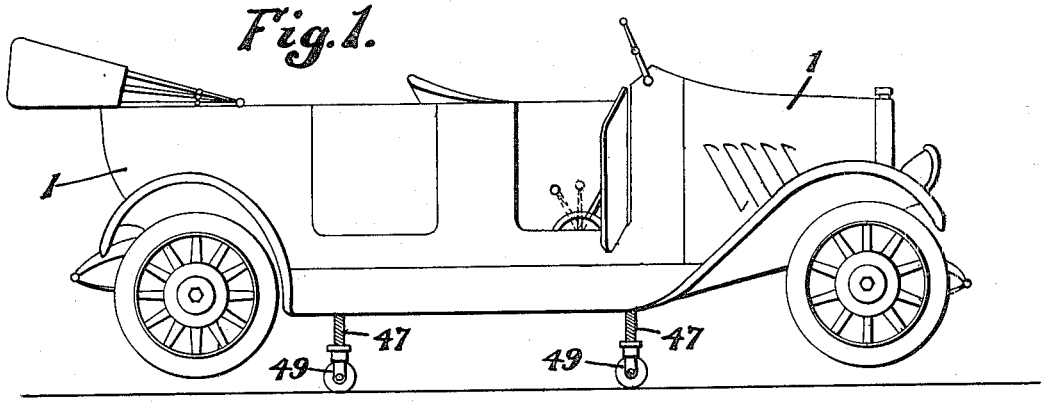
Figure 1 represents a view of an automobile equipped with my device, showing the automobile jacked up and supported thereon.
Figure 4:
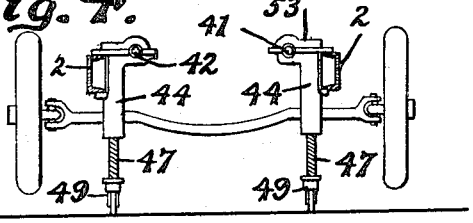
Fig. 4 represents a view taken on line 4—4 in Fig. 3, looking in the direction of the arrows, showing the vehicle jacked up and supported on the device, corresponding to Fig. 1.

First, for jacking up the vehicle from off its wheels, as shown in Figs. 1 and 4, the lever 24 is shifted along the arc 27 from the neutral position shown in Fig. 16 to the end "J" of the slot 26 in the arc member 27, shown in Fig. 23, which results in the shifting of the sliding member 12 so that the jacking-gear 15 is brought into working engagement with the gear 5 of the fly-wheel of the internal combustion engine, or other power means used for propelling the vehicle,—it being understood, of course, that the engine must be running and should preferably be uncoupled or unclutched from the transmitting mechanism of the vehicle. With the jacking-gear 15 thus engaging with the gear 5 which is rotating, the driving shaft 19, to which the jacking-gear 15 is rigidly secured, is caused to rotate and thus results in rotating the driving worm-gear 30 which in turn rotates the shaft 36 through the gear 35 which engages therewith. The shaft 36 rotating, rotates with it the bevel-gears 37 and 38 which drive the bevel-gears 39 and 40, respectively, of the jacking-shafts 41 and 42 respectively. With the rotation of the shafts 41 and 42, the worm-gears 43 are caused to rotate, which engage with and drive the jacking gears 52 which results in rotating the jack-operating shafts 51; said shafts slidably engaging with the square holes provided in the jacking members 47, and rotate the same, causing them (in this instance) to work out from the jack-housings 44, as shown in Figs. 1, 4, 8 and 9, and may thus be allowed to work out to any desired distance, even to the extreme "out" position, shown in Fig. 9, where all the teeth of the jacking members 47 have become disengaged from the teeth of the jack-housing 44, and thereby permit the jacking members 47 to rotate freely without having any further effect of raising the vehicles.

With the jacking members 47 of the set of jacks employed in the device, all working simultaneously, the vehicle will be evenly jacked and supported, and by either stopping the engine or by shifting the operating lever 24 back to the neutral position, shown in Fig. 16, the jacking members will be caused to remain set as they are and will support the vehicle. With the vehicle thus raised from off the ground, or floor, and supported upon the set of jacks, which may consist of four as shown in the drawing, or more or less as may be required, and with the swiveled-roller members 49 free to turn independent of the jacking members 47, the vehicle may be moved about thereon, exactly as though the same were supported upon a truck, or other similar supporting device, thus providing a useful means for jacking and supporting a vehicle and for enabling the operator of a vehicle to easily handle the same in a garage or on the road, as well as for relieving the tires of the load of the vehicle when the same is not in use.

It will thus be observed that besides facilitating the handling of the car in tight quarters, as may be found to be the case in crowded garages, that the same enables the operator to readily change tires on the vehicle, or do other work in connection with the wheels, as well as providing greater working area under the vehicle for the operator or mechanic in making repairs when necessary.

It may be observed at this point, that the height to which the vehicle may be raised, depends upon the length of the jacking members, which may be made to suit the conditions, and also that the same may be designed to accommodate and to handle any weight of vehicle, light or heavy.

Second, to lower the vehicle from the aforesaid jacked position, the engine must be started, and when the fly-wheel has obtained a fair momentum, the operating lever 24 is shifted to the end "L" of the arc 27, which results in engaging the idler and lowering gear 16 with the fly-wheel-gear 5. With the idler-gear 16 engaging with the fly-wheel-gear 5, it will be observed that the gear 17, which is secured to rotate with the operating shaft 19, will cause it to rotate in the reverse direction to that assumed by it when being driven by the jacking-gear 15 engaging with the fly-wheel-gear 5; thus resulting in a reverse motion to the gears 52 which operate the shafts 51. With the shafts 51 operating in the reverse direction to what they had in the jacking instance, it will be observed that the jacking members 47 are consequently worked up back into the housing members 44 by virtue of the threads of the members 47 engaging with the threads of the jacking members 44; thus lowering the vehicle and feeding the set of jacking members 47 back within their housing members 44 into the normal position, as shown in Figs. 2 and 8.

It may be observed that the operating speed of the device, for either jacking the car up or lowering it, may be greatly controlled by the operator by governing the speed that the engine is allowed to run at; also, that by employing gears of suitable ratios in the device, the jacking or lowering speed of the device may be made comparatively slow. Also, that the height of raising the car or vehicle from the ground or floor, may be controlled by the operator. He may jack the same to whatever height he desires, by simply disengaging the jacking gear of the device from the fly-wheel-gear, when the vehicle has reached the required height, or by stopping the engine at that point.

Thus it may be observed, that the jacking members of the device are operated simultaneously and may be fed out of, or into the housing members to any desired distance, and are at all times under the direct control of the operator. It may be further observed that the jacking members toward the tops of the same, are stripped of their threads for a sufficient length, to give them a firm connection with their respective housings when they have been fed out of the housing to the extreme "out" position shown in Fig. 9. The threads for the housings and the jacking members may be made single or multiple, square-shaped, or otherwise, as may be desired,—it being understood, however, that for best results, the jacking members should not be permitted to reach their extreme "out" positions, so that the threads of the same and their respective housing members, may always be in engagement and ready to respond for lowering purposes, without the necessity for reëngaging the threads.

It may thus be observed that the device is simple and compact, and may be applied to any form of self-propelled vehicle, requiring very little power to operate the same, and provides an automatic jacking means at all times ready to go into operation for emergency purposes, or otherwise, affording vehicles, especially those supplied with pneumatic tires, the extra advantage of relieving the load of the vehicle from the tires, when the vehicle is put up for the night in the garage, or when the same is stored for the season.

It must be further understood that the jacks must be positioned at points which will properly support and balance the vehicle, and that the various parts of the device may be inclosed in casings, especially the gears if desired, and supplied with oil for lubricating purposes, so that the same will run quietly and efficiently. The device is simple, accessible, and easy to operate and may be applied to any type of car. The roller members are preferably of the swivel type, for enabling the vehicle to be shifted about when supported on the jacks.

While I have shown the operating mechanism of the device associated with the fly-wheel of the vehicle, I do not wish to be limited against employing other rotatable members connected, or otherwise rotatably associated with the motive power of the vehicle, for producing similar results.

While the preferred embodiments of my invention have been described in detail, it will be understood that I do not wish to be limited to the particular construction set forth, since various changes in the form, material, proportions, arrangement of parts, and in the details of construction may be resorted to without departing from the spirit and scope of the invention, or destroying any of the advantages contained in the same, heretofore described and defined in the subjoined claims.

What I claim is:

1. In combination with a self-propelled vehicle and the prime mover thereof, an automatic jacking device, consisting of a rigid frame member adapted to be secured to the vehicle and provided with guide-runs and a worm-gear; a sliding and shifting gear-carrier-member adapted to slidably operate within said guide-runs of said rigid frame member and provided with a jacking gear, a reverse gear-train, and a shaft driven by said gears and adapted to slidably couple with said worm-gear and rotatably drive the same; a transverse shaft provided with a worm-wheel secured thereto for rotating same, adapted to engage with said worm-gear of said frame member and bevel-gears on either end thereof rigidly secured to said transverse shaft and adapted to rotate therewith; parallel and longitudinal rotatable shafts provided with worm-gears and bevel-gears rigidly secured thereto and adapted to rotate therewith, the latter gears rotatably engaging with said bevel-gears of said transverse shaft; tubular tapped jack-housing-members adapted to be rigidly secured to the vehicle; worm-wheels inclosed in said jack-housing-members, engaging with said worm-gears of said parallel shafts and driven thereby provided with key-spindles adapted to rotate with said worm-wheels within said jack-housings; jacking screw members adapted to operate within said tubular tapped jack-housing-members and provided with sockets adapted to slidably fit said key-spindles; and operating means coupled with said sliding selective member adapted to transmittingly engage the jacking-gear or the reverse gear-train thereof with a rotatable member of the prime mover of the vehicle, substantially as shown.

2. In combination with a self-propelled vehicle and the fly-wheel of the prime mover thereof, an automatic jacking device consisting of a rigid frame member provided with a slidable member, having a rotatable shaft provided with an extension adapted to slide within said frame member; a jacking-gear and reversing gear rotatably mounted on said sliding member and rigidly secured to said shaft of said slidable member; a reversing idler gear rotatably mounted on said slidable member and engaging with said reversing gear of same; a driving gear rotatably mounted in said frame member and rotatably operated by the sliding extension end of said sliding shaft; a transverse shaft rotatably mounted on the vehicle and provided with a driven gear adapted to engage with the driving-gear of said frame member for rotating said shaft, and bevel-gears secured thereto and adapted to rotate therewith; a plurality of vertical jack-housing-tubular-tapped-members adapted to be rigidly secured to the vehicle and provided with gear-housings and shaft-bearings; a plurality of vertical jacking-screws adapted to fit and operate within said tubular jack-housings and provided with central and vertical square-sectioned apertures and bottom swivel-rollers; longitudinal rotatable shafts rotatably mounted in said bearings of said jack-housings and provided with worm-gears rigidly secured thereto to rotate therewith and housed within said gear-housings of said jack-housing-members, and bevel-gears secured to the extreme ends thereof adapted to engage with the bevel-gears of said transverse shaft; worm-gear-wheels housed within said gear-housings of said jack-housing-members engaging with said worm-gears therein and provided with vertical downwardly projecting square-sectioned spindles rigidly secured thereto to rotate therewith and adapted to slidably fit the central square-sectioned apertures of said jacking-screws; and means coupled with said slidable member of said rigid frame member adapted to shift the same for engaging the gears thereof with said fly-wheel gear of said prime mover, at will, substantially as shown.

3. A jacking device comprising a rigid bracket member provided with a vertical tapped cylinder, a housing for gears and a shaft-bearing; a feed-screw-jacking-member adapted to fit and operate within said tapped cylinder of said bracket member, and provided with a central and vertical socket; a vertical socket spindle adapted to slidably operate within said socket of said feed-screw; a worm-wheel positioned within said gear-housing of said bracket member and rigidly secured to said socket spindle for rotating the same; a worm-gear housed within said gear-housing of said bracket member and adapted to engage with said worm-wheel for driving same; and a rotatable shaft supported in said shaft-bearing of said bracket member and secured to said worm-gear for operating same, substantially as shown.

4. A jacking device comprising a rigid bracket member provided with a vertical tapped cylinder, a housing for gears and a shaft-bearing; a feed-screw-jacking-member adapted to fit and operate within said tapped cylinder of said bracket member, and provided with a central and vertical socket; a swiveled roller member secured to the bottom of said feed-screw-jacking-member; a vertical socket spindle adapted to slidably operate within said socket of said feed-screw; a worm-wheel positioned within said gear-housing of said bracket member and rigidly secured to said socket spindle for rotating the same; a worm-gear housed within said gear-housing of said bracket member and adapted to engage with said worm-wheel for driving same; and a rotatable shaft supported in said shaft-bearing of said bracket member and secured to said worm-gear for operating same, substantially as shown.

MYER COHEN.

Witnesses:
B. H. CHERTOK,
R. LICHTENSTEIN.